(12) United States Patent
Hirst

(10) Patent No.: US 7,652,394 B2
(45) Date of Patent: Jan. 26, 2010

(54) RESPONSIVE ELECTRICITY GRID SUBSTATION

(75) Inventor: David Hirst, Brighton (GB)

(73) Assignee: Responsiveload Limited, East Sussex (GB)

( * ) Notice: Subject to any disclaimer, the term of this patent is extended or adjusted under 35 U.S.C. 154(b) by 112 days.

(21) Appl. No.: 10/578,597

(22) PCT Filed: Nov. 4, 2004

(86) PCT No.: PCT/EP2004/012504

§ 371 (c)(1),
(2), (4) Date: Mar. 14, 2007

(87) PCT Pub. No.: WO2005/046019

PCT Pub. Date: May 19, 2005

(65) Prior Publication Data

US 2007/0177319 A1    Aug. 2, 2007

(30) Foreign Application Priority Data

Nov. 7, 2003    (GB) ................................ 0326076.7

(51) Int. Cl.
*H02J 1/00*    (2006.01)
(52) U.S. Cl. ...................................................... 307/73

(58) Field of Classification Search ................... 307/73; 397/73
See application file for complete search history.

(56) References Cited

FOREIGN PATENT DOCUMENTS

| | | |
|---|---|---|
| DE | 42 19 609 A1 | 12/1993 |
| EP | 0749190 A | 12/1996 |
| GB | DE440635 | 2/1935 |
| GB | 2 361 118 A | 10/2001 |
| JP | 11-098694 | 4/1999 |
| JP | 2000-059996 | 2/2000 |
| JP | 2001-103669 | 4/2001 |
| JP | 2001-177990 | 6/2001 |
| JP | 2003-092829 | 3/2003 |
| JP | 2003-289627 | 10/2003 |
| SU | 205116 A1 | 1/1968 |
| SU | 1473002 A1 | 4/1989 |
| WO | WO 96/18937 A | 6/1996 |
| WO | WO99/29008 | 6/1999 |

*Primary Examiner*—Robert L. Deberadinis
(74) *Attorney, Agent, or Firm*—Alix, Yale & Ristas, LLP

(57) ABSTRACT

There is provided an electricity grid, system having a substation connecting two grid parts, preferably at different levels in the grid hierarchy, wherein flow control means is provided for controlling the flow of electricity between the two parts in dependence on the level of stress of the respective grid part of the network.

20 Claims, 7 Drawing Sheets

RESPONSIVE ELECTRICITY GRID SUBSTATION

BACKGROUND OF THE INVENTION

The present invention relates to electricity power supply grids and, in particular, substations connecting the synchronised parts of a grid.

Modern Electricity Grids are inherently unstable. In most circumstances and for most of the time, the inherent instability can be contained and controlled by a variety of control actions and so, for most of us most of the time, the lights stay on.

Unfortunately, failures of equipment do occur. If the failure possibility has not been anticipated and planned is for in the configuration of the Grid, then it can trigger consequent changes in the behaviour of the Grid and flows of electricity that in turn can trigger a cascade of further failures. Various control strategies and actions are designed to minimise the possibility of such cascades, and to minimise their extent when they do occur. No known control strategy can provide guarantees against such failure cascades arising, or their potential extent. Total failure of a Grid and blackout of all supply remains a possibility, although effective implementation of good practice can make this prospect remote, and can shorten the period of a blackout. In Autumn of 2003 we have seen the consequences of this inherent instability in four significant blackouts. A huge blackout in the US, a short but high impact failure in London. A major failure in S. Scandinavia, and a blackout in Italy.

The inherent instability arises from fundamental features of electricity that have driven the Grid design:
  Effective instantaneity of transmission. Electricity travels through wires at fractions of the speed of light. Although various equipment delays the propagation of effects, the effects will still propagate much faster than any status or control data needed if control is to react to actual events.
  The synchronisation of the Grid. The instantaneity of transmission allows all components of the Grid to be locked in or synchronised to the single Grid frequency. The Alternating Current (or A/C) that is core to this is also the basis for many of the features that make A/C the fundamental basis of all electricity Grids.

It is A/C that allowed the founders of the electricity industry to transmit power long distances, and to generate electricity at the large scale that made the early technologies more efficient. A/C can be transformed into very high voltages for efficient long distance transmission, and then transformed back to the lower voltages that are safe and useful for industrial or domestic uses. Subsequent evolution has now created Grids, all synchronised to the same common frequency, and a hierarchy of transmissions services (and thus voltages). Each level of the hierarchy links with lower and higher levels through substations.

Substations consist primarily of switches interconnecting the transformers which convert or transform the voltage. In general transformers are designed to provide one of two services:
  "step up" transformers, so that the lower voltages at which electricity is generated is transformed into the high voltages of the long distance high capacity transmission network, or
  distribution transformers, which convert from higher voltages to the lower voltages suitable for more local networks. Several distribution voltage levels will normally exist before reaching the 230 volts now standard for domestic and office use in Europe.

Electricity Grids have generally been designed on the assumption that power will flow from the high voltage Grid, down through the hierarchy to local demand. Large generators will be providing the power, and are assumed to feed their power into the highest voltage levels, usually via step up transformers.

In Grids, electricity flows according to the physical properties of the network, and any or all electrical path between two points may carry electricity, albeit sometimes with its voltage transformed en route. With sufficient knowledge of the network; the sources and sinks of electricity; and the configuration of the switches the flows can be modelled and so predicted with reasonable accuracy.

There are means of influencing the resulting flows by active or passive control of voltage and reactive power. This control is exercised through generators (adjustment of gensets for voltage and power phasing); transformers (by choice of winding); by power converters (originally motor generator sets but more commonly now Static Converters or STATCONS), and even by judicious selection of transmission circuits.

Grid managers exercise much effort in predicting flows in event of particular component failures and thus involuntary reconfiguration of the network, and using these predictions to define and set configurations that are tolerant of component failures. Depending upon the planning and security objectives, these configurations are normally designed to avoid significant interruptions from any single possible failure. When failures do occur, replanning and manual switching to restore the levels of security become a high priority, so that once again the system is able to cope with single failures.

This replanning depends critically upon a proper understanding of what has actually happened. This understanding can often only be achieved by indirect means, depending upon a range of status signals fed back to the planners and operators. Such status signals are always slower than the effects they are measuring and can be inaccurate and unreliable so it can be hard or impossible to determine the root cause—the actual failure—from such indirect measurements. This makes automatic prediction and thus control too slow to be able to prevent cascades of failure.

Since the potential damage that can arise to the infrastructure from inappropriate electricity flows can be catastrophic for the equipment, automatic protections tend to be tuned to equipment protection, and this is most easily achieved by disconnection and shutdown—and thus blackout.

The scale of potential blackout extends to the whole Grid. So long as the Grids are interconnected by A/C, the flows in all parts are influenced by all other parts. If one part gets disconnected, this impacts the rest, and the configuration will often then be inappropriate for the new circumstances. So further overloads and failures are triggered.

In synchronised Grids as a whole, the frequency plays a central control role. It indicates the balance between generation and load. If there is too much generation, the frequency rises and if too little, it falls. A traditional role of the Grid manager is to ensure that there are controls in place, usually from the generators, so that the generation changes according to frequency. That is, if frequency rises, generators reduce output, and vice versa. An alternative and better way of managing the frequency is to have load devices that operate by a duty cycle, such as refrigerators, adjust their duty cycle according to the frequency. UK Patent Number GB2361118 describes such a system. This control is known as Response, and is a key pre-occupation of Grid managers to ensure that there is enough to respond to the normal random changes in demand as well as exceptional events, such as failures.

When failures cause part of a Grid to be lost or separated (this is known as islanding) from other part or parts of a Grid this will usually mean that the supply (generation) and demand (load) on the remaining part(s) is unbalanced. If there is not enough Response available, this imbalance will be reflected in changes in the frequency. If the frequency deviates too far from its central setting, then further protective relays will open, and further parts of the Grid will be lost.

If the response is not appropriately balanced across the Grid, then this can result in increased electricity flows at the points or circuits (ie substations) where different parts of the Grid are interconnected, and this is often a cause of a further failure in a cascade.

If two parts of a Grid become disconnected, then the frequency of the two parts will tend to differ, and the phasing of the A/C in the two parts will diverge. If there remain any interconnections between the two parts of the Grid (even if these are at quite different levels in the voltage hierarchy), this phase difference will cause unpredictable (and usually very harmful) behaviours where they meet. Later reconnection must also take place only when the two phases are coincident, and must have sufficient capacity to carry the flows that are needed to keep the two reconnected parts in on-going synchronisation. This is hard, and needs additional specialised equipment at various switching substations.

Until very recently, it has been the habit of Grid controllers to manage the system as a single Grid and a single frequency, and to shut down (and have automatic control systems that shut down) all generation and load in any separate islands that might form by separation from the "single" Grid. More recently, the possible reliability benefits of permitting separate islands to remain have been recognised, and there are efforts to form control systems that allow separate islands to survive. Certainly, higher densities of distributed generation make the single island control philosophy less appropriate.

Grids operating at different frequencies can be interconnected, and this is usually done by long distance DC circuits. These operate by converting the A/C from one Grid into DC; carrying the DC a short or long distance; and converting the DC back to A/C at the frequency of the receiving Grid. Recently great strides in the electronics to do this have been made, with semiconductors (transistors and diodes etc.) able to take larger and larger currents. This is a well established field, and so called "digital transformers" and power converters are available for many purposes and in many sizes.

Most DC interconnections are engineered to enable power to flow in either direction, commonly so that peak loads on one Grid can be met in part by power from another Grid whose peaks are a different times. This is most useful if the distance is substantial. Long distance DC transmission lines are used to connect the separate N American electricity Grids, and the cross channel link between the UK Grid and the European continental Grid is extensively used (albeit mostly to import electricity from France).

Power converters are also an increasingly important component of many generating and consuming devices. For example, many wind turbines will include power electronics to modulate their contribution to the Grid.

Substations exist wherever there is a connection between different levels in the Transmission and distribution hierarchy. At the top is the highest voltage level—the Transmission Network—operating in the UK at 400 kV. Other countries use different voltages. Most large generating stations inject electricity into the Grid at this level via step up transformers. This will carry electricity around the country to Grid substations. In most countries, the Transmission Grid has multiple voltage levels—in the UK the lower voltage Grid is 275 kV—and Grid Substations will transform the electricity for this network.

At each level, the Grid can, at least in theory, be partitioned into multiple separate networks interconnected via the higher level network. So separate 275 kV networks can run in different parts of the country. In practice, such networks usually have direct connections also.

The higher voltage transmission network supplies electricity to distribution networks at lower voltages via substations, usually with a further reduction in voltage. Grid Supply Points (GSPs) are also often points where the transfer is metered, and there may be a change in the ownership of the infrastructure now carrying the electricity.

Multiple distribution networks may be fed from a single GSP, and carry the electricity to the many points at which it is consumed, again through a succession of lower voltage networks, with substations where they interconnect.

Individual distribution networks may take their electricity from multiple GSPs, so removing their dependence upon any single supply point (and so ensuring they are unhurt by any single failure.) This invariably means that there is some sort of electrical path, outside the higher voltage transmission network, by which electricity can flow between different GSPs. These multiple electrical paths are one of the features that drive the desire to synchronise as much of the network as possible to the single Grid frequency.

The network control assumption has generally been that electricity flows from the high voltage network to the lower voltage one, reflecting the concept that big power stations achieved the greatest efficiencies. More recently the smaller generators, feeding electricity into the distribution network have become attractive. Electricity from this "embedded generation" is generally assumed to be consumed within the distribution network to which it is connected, doing no more than reducing the flows from the higher voltage network. However, as more distributed generation is installed, at whatever level in the network, this will, at times, generate more power than is consumed within the Distribution Network, so making export to the higher level Grid necessary.

This makes the Grid control problem even more complex and potentially unstable than the simple one way electricity flows. How should the embedded generation be controlled, and how should the electricity flows from distribution networks up to the transmission network be decided? What should happen when there is a fault in any of these networks, and how can these faults be minimised?

The present invention seeks to solve the problems identified above.

SUMMARY OF THE INVENTION

The present invention, in a first aspect, provides a substation connecting two grid parts operating at different frequencies and/or voltage levels, the substation comprising means of monitoring a parameter indicative of the electricity available from and/or the electricity required by the two grid parts and responsive flow control means for controlling the flow of electricity between the two grid parts in response to the parameter of the two grid parts.

Preferably, the parameter of one or both of the grid parts comprises a frequency of the one or both grid parts.

Preferably, the grid parts are different levels in the Grid hierarchy, e.g. a transmission network and a distribution network, or a distribution network and a domestic appliance. The substation may be located between any two parts of the Grid.

The frequency level provides an indication of 'stress' of the grid part or network. The measurement may be e.g. an absolute frequency value or a frequency deviation from a 'normal' operating frequency when the grid part is not under stress.

As the grid parts may be operating at different frequencies and may have unmatched AC phases, means may be provided to match the AC phases or to keep them as close as possible. This may be e.g. in the form of a switch such as described in the specific description.

According to another preferred aspect, the parameter of one or both of the grid parts comprises a signal indicative of an imbalance between the electricity available and electricity required by the one or both of the gird parts.

The management unit regulates response within the grid part or 'domain'. It may also contain information as to the value of electricity to the grid part as a whole, at particular operating frequencies.

The preferred responsive substation resolves the above-mentioned control issues by enabling the Grid—the Transmission and Distribution networks—to be partitioned into multiple frequency domains. It provides a control philosophy that allows the different frequency domains to interact with each other in a self stabilising way, minimising the impact of disturbances, and offering a controlled (and economic) model for management of the substations and power flows.

The control philosophy and principles, and thus the architecture and structure of the ResponsiveSubstation controller, are the same at whatever level in the hierarchy one chooses to apply it. It applies when interconnecting between from the national Grid Transmission Network to a Distribution Network, or from a local suburban distribution network into an individual home or office.

Although, in the preferred arrangements, the invention is responsive to address imbalances in the synchronised grids, the invention may also find application as a trading tool.

Accordingly, in another preferred aspect, the parameter of one or both of the grid parts comprises a value parameter indicative of the value of electricity to the one or both of the grid parts.

The value parameter may (but need not) be a price which each grid part is prepared to pay or charge for electricity. This price may vary depending on the frequency or 'stress' level of the grid part.

According to a second embodiment, the invention provides an electricity supply grid system comprising two grid parts connected by a substation according to the first aspect, wherein each grid part comprises one or more loads and a management unit for providing said parameter.

In a preferred aspect of the electricity supply grid system, said management unit is for regulating the consumption of electricity by said one or more loads in dependence on the frequency of the respective grid part.

These aspects of the invention are, in a most preferred embodiment, used in combination with the first aspect of the invention, so that flow of electricity is controlled depending on frequency or 'stress' levels of the connected grid parts and the value of electricity at that frequency to the grid parts.

The most preferred application of the inventive concepts is in a responsive electricity grid system comprising responsive substations as defined above, in combination with responsive load devices such as described in UK Patent Number GB 2361118.

BRIEF DESCRIPTION OF THE DRAWINGS

Preferred embodiments will now be described, by way of example only, with reference to the accompanying drawings.

DETAILED DESCRIPTION OF THE PREFERRED EMBODIMENTS

Figure 1:
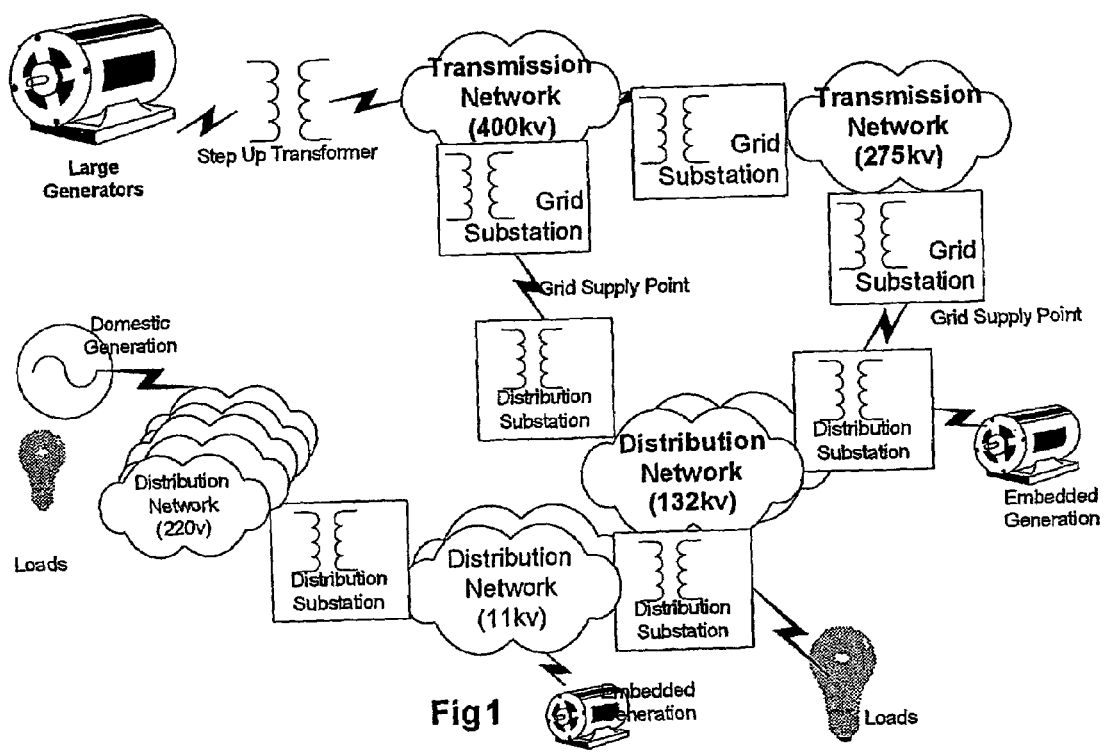
FIG. 1 shows a schematic view of an electricity grid system having substations between different levels in the transmission and distribution hierarchy.

Referring first to FIG. 1, the general concepts behind the present invention and preferred embodiments will now be described.

As described above, an electricity grid is made up of a hierarchy of levels or networks connected by substations.

At the top is the highest voltage level—the Transmission Network—operating in the UK at 400 kV. Other countries use different voltages. Most large generating stations inject electricity into the Grid at this level via step up transformers. This will carry electricity around the country to Grid substations. In most countries, the Transmission Grid has multiple voltage levels—in the UK the lower voltage Grid is 275 kV—and Grid Substations will transform the electricity for this network.

At each level, the Grid can, at least in theory, be partitioned into multiple separate networks interconnected via the higher level network. So separate 275 kV networks can run in different parts of the country. In practice, such networks usually have direct connections also.

The higher voltage transmission network supplies electricity to distribution networks at lower voltages via substations, usually with a further reduction in voltage. Grid Supply Points (GSPs) are also often points where the transfer is metered, and there may be a change in the ownership of the infrastructure now carrying the electricity.

Multiple distribution networks may be fed from a single GSP, and carries the electricity to the many points at which it is consumed, again through a succession of lower voltage networks, with substations where they interconnect.

Core to the ResponsiveSubstation concept is the emergent feature of synchronous networks that all devices on the network are synchronised to a single frequency, and that this frequency varies according to the imbalance of supply and demand on the network. This frequency is a signal to all participants as to the state of the network, and one used by some participants to modulate their behaviour to provide stability.

This signal is noisy, fluctuating up and down continuously according to instantaneous changes in demand and supply. To minimise the extent of this fluctuation and so make clearer the signal it is helpful to make the scope of the Grid as large as possible, thus statistically smoothing individual fluctuations across a larger population. This is one of the drivers towards larger Grids.

However, if there is an adequate provision of Response (ideally in the form of ResponsiveLoad devices—smaller duty cycle devices that modulate their consumption according to the Grid frequency, and so help achieve a more even balance) then stability of the frequency signal can be achieved within much smaller domains. With ResponsiveLoad devices, imbalance can also be tolerated for much longer without disturbing the stability of the domain, and so giving opportunities for considered actions to restore the imbalances.

Within these smaller domains, there will still be a need to:
generate more or less electricity within the domain;
to consume more or less electricity within the domain; or
to import or export electricity from other domain(s).

The volume of the need, whether or not this has been reduced within a network or grid part by operation of ResponsiveLoad devices, can be directly derived from the deviation of the frequency from the chosen central or control frequency (e.g. 50 Hz or 60 Hz) of the domain. With knowledge of the "normal" demand the extent of the instantaneous shortfall (in, for example, kW) is a function of the departure in frequency from the control frequency (in Hz) along with parameters that reflect the extent and nature of the ResponsiveLoad and the thermal inertia it can call on. If this departure has persisted for some time, the volume of deferred demand (in for example kWh) can be directly derived by integrating the departure of the frequency since it was last at its desired point and again the key parameters reflecting the ResponsiveLoad. In practice, this can be measured by measuring how far a clock driven by the frequency departs from an accurate clock.

Since the knowledge of the "normal" demand of the network does not change quickly, it is a parameter that can be readily derived and passed to all participants (whether automatic or human) who can modulate their consuming or generating behaviour. While it does change over a day and a week, it is usually quite predictable, and so can be disseminated to participants well in advance of real time.

When there are imbalances, participants can know the extent of the imbalances and decide how they are going to react. The management of the frequency domain can influence these decisions by, for example, publishing in advance the price they are prepared to pay (or charge) to correct specified levels of imbalances. They can, for example, declare that they will be prepared to pay $50 per MWh for extra electricity delivered (within a meter period) when the shortfall exceeds (say) 5 MWh. The shortfall can readily be expressed in seconds of clock delay rather than MWh. In this context, extra electricity delivered is exactly equivalent to electricity not consumed.

So all participants can set their control systems to react to this signal according to their price sensitivity. High consuming devices (such as water heaters or storage heaters) can be set to consume only when there is no shortfall, and so avoid the extra costs. Those with backup or peaking generators can set their systems to inject electricity into the Grid when the price threshold exceeds their cost. Generators can increase or reduce their output to reflect the change in cost.

Also, ResponsiveSubstations can choose whether to increase or reduce the electricity that flows to or from the other network to which they are connected. They control a portion of the import and export to or from the domain.

ResponsiveSubstations have a further complication, in that they must take into account the state of the other network. However, the other network will have its own frequency domain, and so its own signals as to the extent of the imbalance. It will have its own management, and the set of prices published for that domain. The ResponsiveSubstation can use this price comparison to decide whether to change the flows passing through it. If the price on one network is high, and on the other low, then it increases flows from the low price side to the high price side (or reduces flows the other way).

These changes in flows will, perhaps only in a small way, change the imbalances on each network and so change the frequencies involved. This will, in turn move devices on both side to different points on their price curves, and so continue to modulate their behaviour.

In aspects or embodiments of the invention where a 'value' of electricity is taken into account, this is preferably in terms of price. Price is a convenient and very powerful way of expressing the modulation of generation and consuming behaviour in ways that stabilise the Grid. It may also provide an underlying economic rationale to encourage this behaviour that reflects the economic and commercial relationship that will often exist between participants. But the price need not be financial. In some Grids, for example within an industrial estate, the "prices" passed to ResponsiveSubstations and ResponsiveDevices may reflect the outcome of complex control optimisation analyses, with the price no more than a convenient parameter to manage the co-ordination of the devices.

In most countries, electricity is metered at the wholesale level over quite short periods, in the UK every half hour. Wholesale deals specify the price and electricity to be delivered in each half hour, and this can readily be used to set the default flow (the flow if there is no imbalance on either Grid) through a ResponsiveSubstation. Departures from this default flow in response to imbalances are not set in the base deal, and it is these prices that are moderated by the management of the frequency domain.

Thus, where price plays a role in controlling the flow of electricity, there should be a measure of the ResponsiveSubstations' contribution to (or deduction from) their respective Grids. It may be that the signals used to control flows will be acceptable as metering records, but ResponsiveSubstations may also include meters to record electricity flows. These meters feed into the ResponsiveSubstation controller, which then multiplies the difference in flow from the default by the price, as calculated from the frequency signal, and accumulates the value due to or from the frequency domain or grid part management.

The domain (or grid part) management will, of course, maintain a record of the instantaneous price, and will also know the total power flow across a ResponsiveSubstation over the meter period. These will need to be consistent with the price claim of the ResponsiveSubstation. There remains a possibility that the ResponsiveSubstation will have "gamed" so flowing electricity against the best interests of the Grid and for its own profit. (For example, by flowing extra electricity at low prices and reducing flow at high prices.) Given the unpredictability of the prices and the imbalances, this will either result in inconsistency of meter readings or in losses of profit opportunity when the gaming is being unwound. Nevertheless, metering aspects of the controller may need control and management by an external verifier.

There should also be a "central" price for each Grid. This is the price of a change in electricity flows while the Grid is operating at its central frequency, and market arbitrage will normally ensure that the price on the two sides is identical. If a ResponsiveSubstation sees a low frequency on one Grid, its import of additional electricity to it may not be material on the frequency of the exporting Grid, but this electricity cannot be free.

Failure modes may occur, in which contracted electricity does not flow, and this can be treated as an equivalent reverse flow that needs to be paid for at the (variable) price indicated by the exporting Grid management system.

When there are failures, it may be helpful to attribute the failure to one side or another, and have a price differential associated with the failure attribution. If a ResponsiveSubstation is fit and ready to export, but no electricity is available, it is the exporting system that should not receive the full value of its "exports".

If, on the other hand, the importing ResponsiveSubstation or Grid is unable to receive the flow, then its unintentional "exports" should be discounted.

Each Grid management will have to derive its own price formulae for converting the Grid frequency imbalance signal into a value that it will pay (or charge), ResponsiveSubstations on its Grid. This is a complex analytical and market exercise (outside the scope of this application), and needs to be designed to give appropriate signals to participants (including demand participants) as to the value of security of supply.

There may be sensible business models whereby sets of ResponsiveSubstations on a Grid may be owned and/or operated by different organisations, and each of these organisations may have their own Grid management systems. These Grid management systems may publish prices that are offered only to corresponding ResponsiveSubstations on the Grid. To preserve Grid stability some sort of co-ordination between the Grid management systems may be desirable, but the inherent stability of the ResponsiveGrid may make this unnecessary.

An example is a possible evolution of the UK Stage 2 retail electricity markets, which could require competing suppliers to have their own infrastructure on each local Grid in the form of their own ResponsiveSubstation through which electricity is flowed to meet the needs of their customers, each with their own domestic ResponsiveSubstation communicating with the suppliers Grid management system.

In such circumstances, it is possible for multiple ResponsiveSubstation controllers—the control and pricing logic—to be dedicated to each supplier, but for the electricity flows to be integrated into a single physical set of power controllers. The flows demanded by each ResponsiveSubstation Controller are summed to give a total electricity flow, and the metered flow is proportionately attributed to each Controller.

Such "virtual" ResponsiveSubstations are one way in which the owners of the distribution network can provide services to competing suppliers.

Most of the time and in most cases short departures from balance, and thus short term variations in the central frequency are of no commercial or engineering consequence. With an appropriate population of ResponsiveLoad devices short term variations are smoothed, even in small Grids.

One of the key benefits of ResponsiveLoad is its capacity to let the Grid absorb big fluctuations, such as loss of a big power station, or loss of a major transmission line, with minimum impact on the operation of the Grid. The impact is dissipated across a large population of devices, giving time for corrective control or market reaction.

After such events on a synchronous Grid, very quickly the electricity flows across A/C substations will change, some increasing flows and some (particularly those feeding an area with a high density of ResponsiveLoad devices) reducing them.

If the networks are connected only by ResponsiveSubstations responsive to price or 'value' parameters, the network on which the major failure happens will suffer a steep decline (or rise) in frequency, but the electricity flows across the substations connected to it will remain unchanged until the price mechanism cuts in, and the ResponsiveSubstations start modifying their flow in reaction to the change in frequency, thus changing the frequency of their other Grids, thus bringing in Response (and ResponsiveLoad) on these networks.

In some cases this may be too slow and it may be appropriate for ResponsiveSubstations to modify their flows immediately in response to fast changes in frequency on one side or the other of their connected networks. The frequency domain in which big failures take place may (at least initially) have a preponderance of large generation, and so be able to respond only slowly to the changes in frequency. It is then desireable for that domain to gain access to the response available in other networks, and particularly the Distribution Networks where, ideally, ResponsiveLoad will be concentrated.

One possibility is to have a "Response Pass-through" mode of operation of ResponsiveSubstations in which the control is to try and lock the two frequencies together. So the ResponsiveSubstation modulates its flow to strive to keep the two frequencies as close as possible, changing flows in immediate response to frequency changes on either Grid. This mode operates until the stress on the overall Grid exceeds a threshold, and the ResponsiveSubstation reverts to price sensitive flows.

This could be implemented as an A/C switch within the ResponsiveSubstation, which is closed in "Response Pass-through" operation, but opens when a Grid stress threshold is reached. It will then be closed again when stability is restored (and the two networks are in phase). This possibility is incorporated into the ResponsiveSubstation architecture.

Such operation does raise complications concerning handling the (inevitable) differences in flow from the contracted default flow and the actual flow arising from Responsive behaviour. This can be handled by contracted payments to cover the variations.

Grids are subject to fault events, such as the failure of a transmission line or the failure of a substation.

If the fault causes a loss of supply to a Grid, or loss of demand from the grid, the impact of the loss on the frequency will depend upon the proportion of the total electricity flow to or from the Grid that was carried by the failed system. If, as will often be the case, the flow to a Grid is being carried by two substation, the loss of flow from one will represent around 50% of the electricity flow into that Grid.

With the current generation of synchronous grids, this loss of electricity flow from one substation will be instantaneously transferred to the other. In the words of the Statement to the House Energy and Commerce Committee for its hearing on the Northeast Blackout of August 2003 "When an element trips, existing power flows are instantaneously redistributed onto other elements of the grid according to the laws of physics, irrespective of state boundaries or ownership of the transmission facilities."

If ResponsiveSubstations are in use, the redistribution will not happen instantaneously, and the behaviour of the Grid will depend upon the depth of Response available. If the change is significantly greater than the available response, the Grid will cascade to Blackout.

There is, however, a short time during which the frequency will be falling fast, but will still be within limits. If this rate of change is detected by ResponsiveSubstations which have capacity to rapidly change their electricity flows in the desired direction, the cascade can be prevented.

The ResponsiveSubstation may also detect failures whose direct impact is more on the voltage rather than the frequency.

Delivering such rapid changes of flow is likely to be of economic value far greater than any possible value of the flowed electricity, so it is reasonable to suspend, at least for a while, the price based mechanisms for controlling flow, and reward instead the event recovery action.

Such event recovery actions will usually be pre-programmed into the ResponsiveSubstation, and any price based reward can also be pre-programmed.

This is achieved by having an "Event Recovery" mode for the Flow Decider element of the ResponsiveSubstation.

If the speed of detection and change of flow cannot be achieved, it would become desirable to limit the flow to or from any Grid through any one ResponsiveSubstation to approximately the total available Response on the Grid.

A ResponsiveSubstation will, via its power electronics, have opportunities to influence the voltage and transmission of reactive electricity on both the Grids to which it is connected. Such influence is, by its nature, more local than the Grids involved, but may also be subject to active local feedback control using parameters set by the Grid management Centres. The strategy for exercising this influence is beyond the scope of this specification. However, ResponsiveSubstations will normally be able to provide voltage control and reactive load services of value to the Grids without undue detriment to the ResponsiveSubstation services.

ResponsiveGrids should very rarely black out. When they do, the ResponsiveSubstation provides support for rapid recovery. Two concepts are key to Black Start:

The use of special Grid Crisis Grid Frequencies. This uses a separate lower Grid frequency that is used only during crisis and start up. This will normally be 10% lower than the Grid frequency for normal use, and will be the frequency used when a Grid is first energised.

Appointment of a Black Start ResponsiveSubstation. This is a substation that, when it sees an unenergised Grid, but has electricity available from its other Grid, is responsible for first energising it. In general, a ResponsiveGrid will have only a single Black Start ResponsiveSubstation. However, since this creates the possibility of a blacked out Grid not being re-energised if the single Black Start ResponsiveSubstation has failed, or itself sees no electricity on its other Grid, there may also be a priority system, with protocols, with and without use of the internet, to decide which one will take the first step. There can also be feedback to detect if there appears to be a conflict, with multiple sources of unsynchronised electricity. When this happens, the Ethernet technique of exponential back off can be applied to decide.

These two concepts allow the ResponsiveSubstations on a Grid to progressively flow more electricity using the pricing mechanism (perhaps using special pricing tables/parameters initially) until normal Grid Frequency is approached, and loads can again consume. This will be much faster in operation than pre-planned manual operations.

The key role of a ResponsiveSubstation lies within the Grid, and the management of flows between parts of the overall Grid network. However, the concept and the device is useful even if one side of the ResponsiveSubstation is reduced to a simple and basic generating or consuming device. So long as:

it is economically sensible for the ResponsiveDevices to have communications (likely via the internet) with its appropriate Grid Management Centres, and so have access to default flows and prices;

the device can incorporate a meter acceptable to the Grid management; and the device can exercise some control over its behaviour, then a ResponsiveSubstation may exist within home, a cooker, a washing machine a heater, a boiler, a CHP plant, microgeneration, a wind or tide turbine, even a photovoltaic array. Indeed a vast array of intelligent devices.

Figure 2:
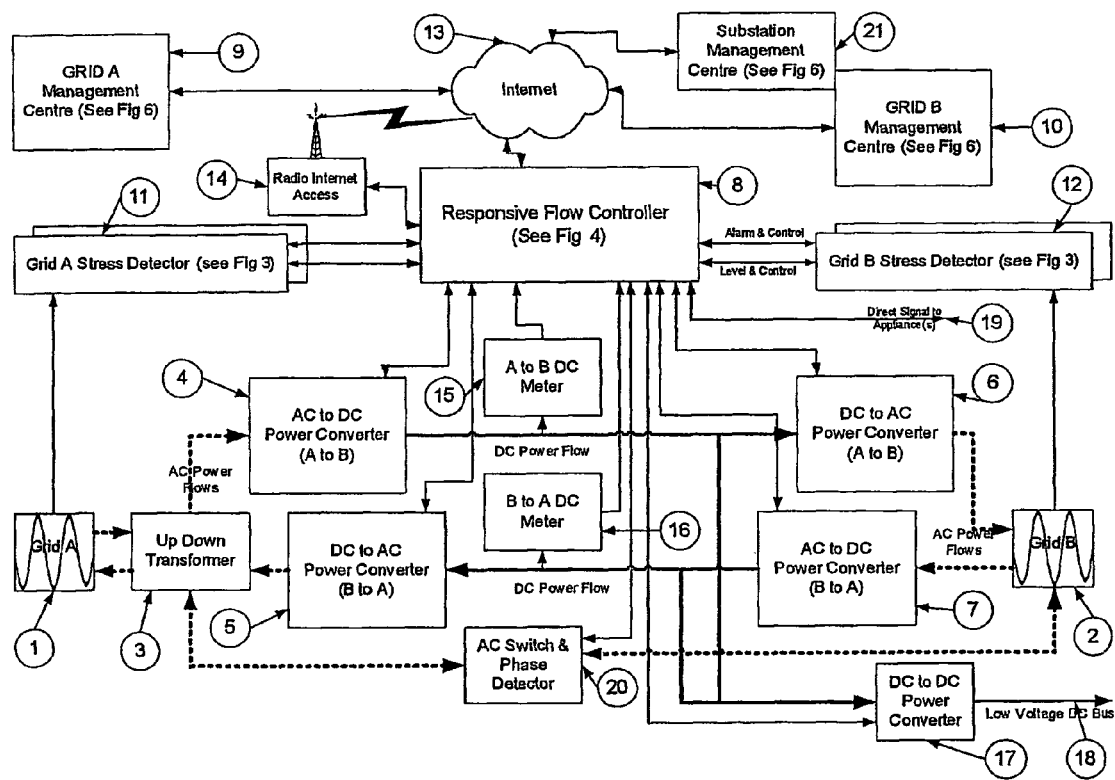
FIG. 2 shows a block diagram of a responsive substation in accordance with the present invention.

Referring now to FIG. 2, a preferred embodiment of the responsive substation will now be described in more detail.

FIG. 2 shows a possible embodiment of a ResponsiveSubstation. It provides and controls electricity flow between two Grids, known as Grid A 1 and Grid B 2. For purposes of explanation, Grid A is assumed to he higher in the ResponsiveGrid hierarchy than Grid B, and so may operate at a higher voltage. When it does so, the higher voltage is reached by an (optional) step up down transformer 3, which converts the working internal voltage of the ResponsiveSubstation to the Grid A voltage. Grid A (optionally via the step down services of the transformer 3) is then connected to an AC to DC Power Converter (A to B) 4 which, when electricity is flowing from Grid A, converts the electricity to DC and controls how much flows.

Grid A is also connected (optionally via the step up services of the transformer 3) to a DC to AC Power Converter (B to A) 5. When electricity is flowing into Grid A the DC to AC converter controls the voltage and phasing of the electricity.

Grid B 2 is similarly connected, but will not normally need a step up down transformer. It is connected to the AC to DC Power Converter (B to A) 6 which, when electricity is flowing from Grid B converts the AC to DC and controls the quantity of the flow. Grid B is also connected to the DC to AC Power Converter (A to B) 7, which, when electricity is flowing into Grid B controls the voltage and phasing of the electricity.

These power converters together are one embodiment of power electronics able to control the quantity of electricity flowing in either direction between Grids A & B and known as a Responsive Power Converter.

The power converters will normally have a capability to influence or directly control the voltage at the point at which they connect to the Grids. The necessary voltage control systems and associated parameters will normally be embedded within a Responsive Substation, but are beyond the scope of this specification.

Figure 6:
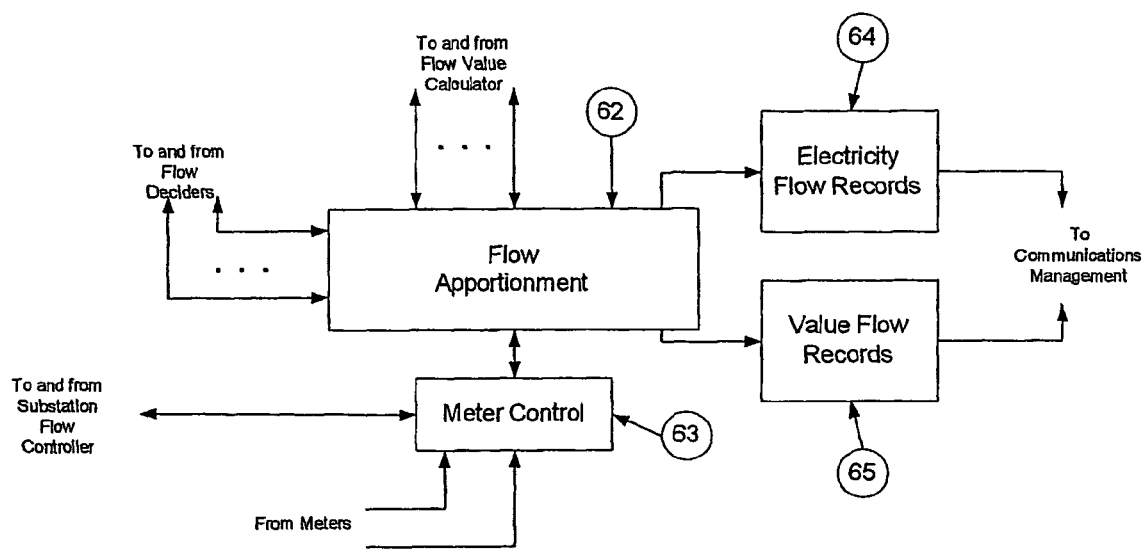
FIG. 6 shows a block diagram of a substation measurement controller.

The Responsive Flow Controller 8 also explained further below (FIG. 4) decides how much electricity is to flow, and controls the Responsive Power Converter accordingly. It does this, in the preferred embodiment, by using prices, parameters and policies published and communicated from time to time by Management Centres. The substation of the invention controls the flow of electricity according to conditions on one or both of the grid parts connected to it. This may be frequency (to be responsive to imbalances) and/or some other parameter such as the price each grid part is prepared to pay or charge for electricity. In the preferred embodiment, both frequency and price are taken into account. The Grid A Management Centre 9 publishes prices information concerning Grid A. The Grid B Management Centre 10 publishes information corresponding to each Grid, and the Substation Management Centre 21 publishes information directing the ResponsiveSubstation. These centres may (but need not be) under different ownership. FIG. 6 shows how these centres are linked to each other.

These Centres are linked to the ResponsiveSubstation using conventional communications technologies, likely to include the internet 13, and this may be reached by a Radio Internet Access 14. These communications will be protected by various conventional encryption technologies to ensure communications between them are secure against unauthorised or malicious messages.

A key feature is that the communications between the Responsive Flow Controller and the various Management Centres need not be in real time for the ResponsiveSubstation to operate. Even when the communications are unavailable for quite long periods (even indefinitely) the ResponsiveSubstation will continue to operate and provide its services. It does so by taking and reacting to signals from one or more Grid Stress Detectors associated with each Grid. So Grid A has at least one Grid A Stress Detector 11 and Grid B has at least one Grid B Stress Detector 12. These devices can be identical and are described further below (see FIG. 3.) The Grid Stress Detectors may also monitor a variety of thresholds that can change the mode of operation of the Responsive Flow Controller.

Multiple Grid Stress Detectors can play a role when either or both Grids are in crisis, and during Black Start. At these times it can be useful to define a crisis mode of operation used only for energising the Grid. In normal operation only one is needed, and not all ResponsiveSubstations need the extra capability even in crisis.

By comparing the Grid stress state of the two Grids, A & B, the Responsive Flow Controller makes decisions as to quantity of electricity to flow between the Grids in such a way as to support the stability of both grids depending upon the stress they are under. More detailed examination of how this is done is given below (see FIG. 4).

Changes in electricity flow have economic implications for both Grids. So the ResponsiveSubstation incorporates measurement systems to record the power flows and convert these into transactions. This takes the form of Meters recording the flows: An A to B DC Meter 15, and a B to A DC Meter 16. The processing of the meter readings is discussed further below (see FIG. 6).

Grid B may be very small, perhaps a single home or a power distribution system within a product or plant. It may therefore be appropriate to distribute electricity on a Low Voltage DC Bus 18, with the voltage on this bus formed by a DC to DC Power Converter 17.

If Grid B is small, it may be appropriate to exercise control of devices and appliances, directly from the Responsive Flow Controller, whether or not they are fed by an A/C Grid. This signal 19 replaces the signal intrinsically carried in the Grid B frequency, and so controls the consumption of Grid B devices.

For example, an appliance could be a grid part, albeit a very simple one. As shown in FIG. 2, a direct signal 19 to the appliance from the flow controller 8 would be used, making it possible to do without the power converters and just use the price of Grid A to guide the appliance. In one form, the appliance can use the A/C from Grid A to feed, for example, its motors and/or its heaters etc. The flow to the appliance would be controlled by the Grid A stress (or price) in combination with the Grid B (appliance) fixed parameters. One example of the form of a fixed parameter for Grid B could be a button set on the appliance which can be set to either "urgent" or "cheap".

In some circumstances it may be desirable to reduce the time in use of the Responsive Power Converters, and for the normal operation of two Grids A and B to be fully synchronised. When this is necessary and useful the AC Switch and Phase Detector 20 can be fitted. This provides an electrical path between the two Grids, thus keeping them fully synchronised, and leaving the Responsive Power Converters out of use. When, however, circumstances arise when the synchronisation puts one or both of the two Grids at risk, the Responsive Flow Controller can instruct an opening of the switch, forcing any flows to pass through the Responsive Power Converters, and bringing the electricity flow fully under the control of the Responsive Flow Controller. When the-Responsive Flow controller again determines that a direct A/C flow is desirable, it will instruct the AC Switch and Phase Detector 20 to close when next the two Grids are detected as being phase synchronised.

A preferred embodiment of the grid stress detectors mentioned above will now be described with reference to FIG. 3

Figure 3:
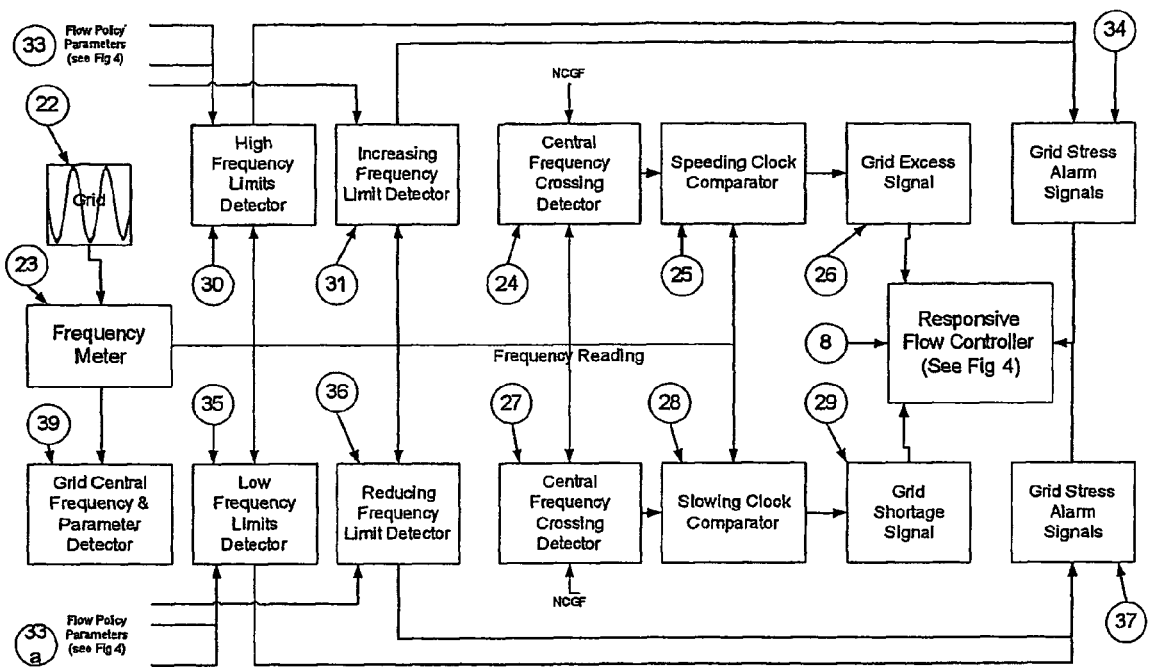
FIG. 3 shows a block diagram of a grid stress detector for use in the preferred embodiment of the invention.

FIG. 3 shows a possible embodiment of a Grid Stress Detector, feeding signals about a Grid into the Responsive Flow Controller.

The input is from the Grid 22, which feeds a Frequency Meter 23. The Frequency Meter 23 than feeds the frequency measurement into a parallel series of devices, one set involved when the Grid frequency is above the nominal central frequency and a corresponding set involved when the Grid frequency is below the nominal central frequency.

Grid frequencies above the Central Frequency involve a Central Frequency Crossing Detector 24, which creates a trigger signal whenever the Grid frequency passes from below the Nominal Central Grid Frequency to above it. The Nominal Central Grid Frequency NCGF A or NCGF B is a parameter passed to it from within the Responsive Flow Controller. The trigger signal is passed to a Speeding Clock Comparator 25, which uses it to reset its output to zero and to lock the start of the clock comparison. From then on until reset the Speeding Clock Comparator 25 compares a clock driven from the Grid frequency with a clock driven by the NCGF, and the difference between the two clock is the Grid Excess Signal 26 passed to the Responsive Flow Controller 8.

This signal is a function of the accumulated excess generation of the connected Grid since the NCGF was last seen.

Grid frequencies below the NCGF involve a further Central Frequency Crossing Detector 27 which creates a trigger signal whenever the NCGF passes from above to below the NCGF. NCGF is as described above. The trigger signal is passed to the Slowing Clock Comparator 28, which uses it to reset its output to zero and to lock the start of the clock comparison. From then on until reset the Slowing Clock Comparator 28 compares a clock driven from the Grid frequency with a clock driven by the NCGF, and the difference between the two clocks is the Grid Shortage Signal 29 passed to the Responsive Flow Controller 8.

This signal is directly proportionate to the accumulated generation shortage (equivalent to demand excess) of the connected Grid since the NCGF was last seen.

A possible simplification is to have a single Central Frequency Crossing Detector and feed the same trigger signal into both clock comparators. Thus both Grid Excess and Grid Shortage signals would be reset when the NCGF is seen.

A further alternative is to also maintain an on-going Grid Excess signal, so that an awareness of history over a while is maintained.

Other embodiments are possible with the key feature being an output functionally related to the accumulation of Grid excess or Grid shortages since a reset point. The reset point may be the Grid frequency passing the NCGF, or, in order to avoid frequent resetting when the frequency is very close to NCGF, it may be a more complex function of the history of passing the NCGF.

The Grid Stress Detector described so far can provide a "pure" Responsive Flow Controller with all it needs to make optimum decisions concerning the flows between Grids. For greater choice in configuration during transition stages, the Grid Stress Detector may also include further components to detect Grid stresses that can be used to decide the mode of operation of a Responsive Flow Controller.

Again, these are divided into components involved when the Grid frequency is above the NCGF and another set for when the Grid frequency is below the NCGF.

Figure 4:
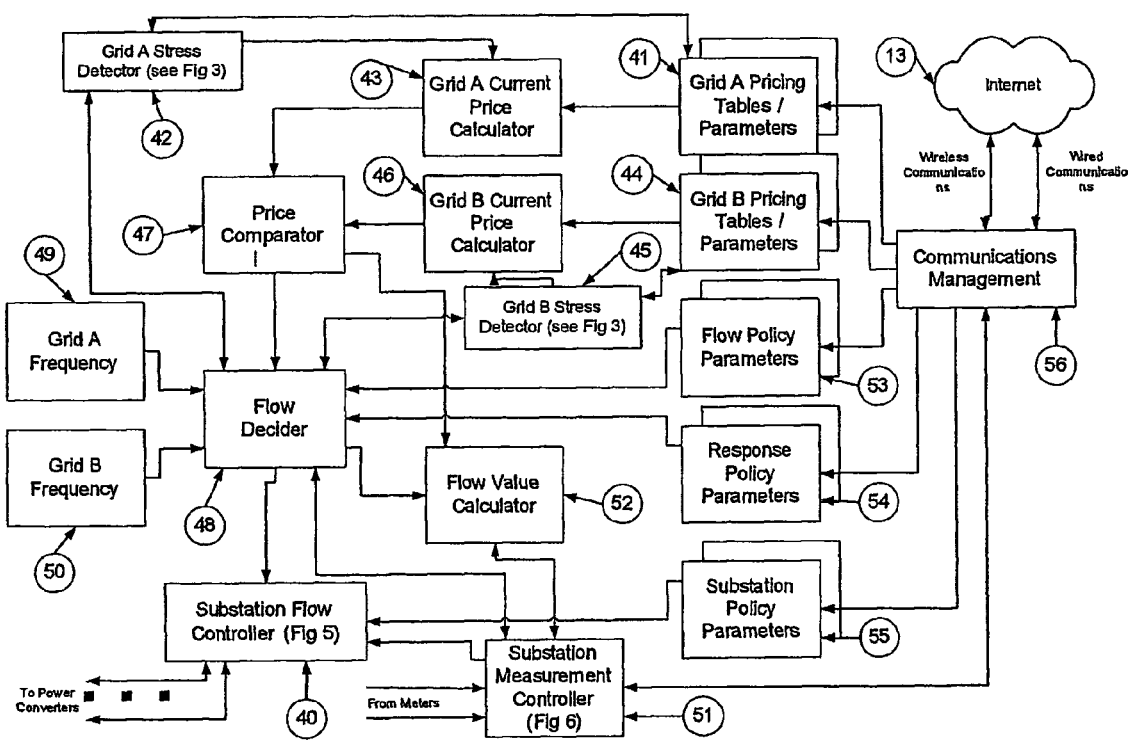
FIG. 4 shows a block diagram of a responsive flow controller for use in a preferred embodiment of the invention.

The High Frequency Limits Detector 30 compares the measured frequency with limits defined by parameters 33 passed from the Responsive Flow Controller (as part of the Flow Policy Parameters 53 of FIG. 4). There are two frequency limits: FHGC which defines the Grid frequency at which the Grid is deemed to be under high frequency stress. And FHMax, which defines the Grid frequency at which the Grid is deemed to be in high frequency crisis. The Increasing Frequency Limit Detector 31 compares the rate of change of the Grid frequency with a limit FDIGS. This defines the maximum rate (Delta) at which the Grid frequency can increase before the Grid is deemed to be under low frequency stress.

When any of these limits are exceeded, Grid Stress Alarm Signals 34 are passed to the Responsive Flow Controller, which may then change its mode accordingly.

The Low Frequency Limits Detector 35 compares the measured frequency with limits defined by parameters 33*a* passed from the Responsive Flow Controller (as part of the Flow Policy Parameters 53 of FIG. 4). There are two frequency limits: FLGC which defines the Grid frequency at which the Grid is deemed to be under low frequency stress. And FLMin, which defines the Grid frequency at which the Grid is deemed to be in low frequency crisis. The Reducing Frequency Limit Detector 36 compares the rate of change of the Grid frequency with a limit FDRGS. This defines the maximum rate (Delta) at which the Grid frequency can reduce before the Grid is deemed to be under low frequency stress.

When any of these limits are exceeded, Grid Stress Alarm Signals 37 are passed to the Responsive Flow Controller, which may then change its mode accordingly.

In some circumstances, it may be desirable for the Grid Stress Detector to determine for itself the NCGF and other parameters from measurements available from the Frequency Meter. This is the role of the Grid Central Frequency and Parameter Detector 39.

The Grid Central Frequency and Parameter Detector has three major roles:

1. When a Grid is first energised, and so a Grid frequency is measurable for the first time, the Grid Central Frequency and Parameter Detector uses the first few readings to decide what the NCGF could be. So, if there is no NCGF available from a Grid Management Centre, the ResponsiveSubstation can still deliver useful function.
2. If a Grid is capable of operating with two or more NCGFs, then the Grid Central Frequency and Parameter Detector will choose which one is current, and thus decide the mode within which the Grid is running. For example, there may be a Grid crisis frequency that is below that used in normal operation, but that is used in Grid crisis or Black Start circumstances. When the Grid is operating in this mode, and so with this low frequency as the NCGF, electricity flow may be wholly reserved for Grid survival and restoration, and all other uses of electricity prevented. The Central Frequency and Parameter Detector will also decide when the Grid frequency has reached a point where more normal operation of the ResponsiveSubstation is possible, and shift the NCGF to the normal central frequency.
3. In normal operation the Grid Central Frequency and Parameter Detector uses the frequency readings it received to build a history of the Grid frequency and its normal variation. Various parameters for use in default situations where reliable parameters are not available to the ResponsiveSubstation can then be derived from this history. For example, FHGC, FHMax, FDIGC, FLGC, FLMin, and FDRGC can all be derived from an analysis of the variations in frequency over a period using default proportions of the experienced variations.

When operated in conjunction with a Flow Decider 48 (of FIG. 4), the Grid Central Frequency and Parameter Decider can assess how great is the impact on the frequency of a specific change in the electricity flow through the ResponsiveSubstation. When a perturbing step change in electricity flow is implemented, the frequency changes. By comparing the two changing parameters over a short period, some indication of the electricity demand of the Grid can be derived. This, in turn, can be used to derive default Flow Policy Parameters 53 of FIG. 4, and default pricing parameters. This would give the ResponsiveSubstation stable methods of controlling electricity flows even in the absence of a Grid Management Centre or communication with it.

A preferred embodiment of the responsive flow controller will now be described with reference to FIGS. 4 and 5.

The Responsive Flow Controller is responsible for deciding what the electricity flow through the ResponsiveSubstation should be. Each ResponsiveSubstation will have a single Substation Flow Controller 40 (see also FIG. 5). This controls the Responsive Power Converters, using inputs from one or more Flow Deciders 48. The multiple Flow Deciders (and associated logic) are to enable the owner of the ResponsiveSubstation to sell portions of the ResponsiveSubstation capacity to other participants in the ResponsiveGrid, thus enabling market activity to influence Grid behaviours. In effect, a single ResponsiveSubstation can behave as several virtual ResponsiveSubstations.

The Responsive Flow Controller operates by deriving and comparing the prices available on the two Grids Grid A and Grid B. Each Grid has its own pricing tables and parameters, its own Grid Stress Detector(s) and its own Current Price Calculator.

Grid A Pricing Tables and Parameters 41 and a Grid A Stress Detector 42 feed into a Grid A Current Price Calculator 43. This uses the Grid Excess or Grid Shortage signal from the Grid A Stress detector to calculate or derive the price Grid A is prepared to pay for increased flow (when the Grid is short), or the price at which it will buy reduced flow.

One embodiment of this calculation is to use the Grid Excess (or Grid Shortage) signal to select an entry from the set of entries in the Grid A Pricing Tables/Parameters. Alternative embodiments may use one or more parameters to be used in an arithmetic operation on the Grid Excess Signal to derive a price signal.

Other embodiments may also make a selection of the Pricing Tables/Parameters to be used in the price calculation depending upon circumstances. For example, there may be a default set of pricing tables/parameters, which are to be used if there has been a loss of communication with the Grid Management Centre, and the information has time expired. There may also be different sets of pricing data concerning different metering periods within a day, or a week, or over a longer period. A metering period is a period forming the basis for contracting electricity flows and their prices. In the UK this is a half hour, but other countries and/or other grids may use different periods. The choice of embodiment will depend upon design objectives for the specific ResponsiveSubstation. Other embodiments may also use information from the Grid Stress detectors-to derive parameters that reflect the experience of the Responsive Flow Controller over time, and so that provide a basic workable set of parameters for use when the ResponsiveSubstation has no communications with a Grid Management Centre.

Grid B is precisely parallel, with a set of Grid B Pricing Tables/Parameters 44 and Grid B Stress Detector 45 and a Grid B Current Price Calculator 46. The Grid A Current Price and the Grid B Current Price feed into a Price Comparator 47. This compares the two prices and thus the current value of changing the electricity flow. This is fed to the Flow Decider 48. The Flow Decider uses the information available to it from various sources to decide how much electricity should flow. The sources are: the Grid A Frequency 49 and the Grid B Frequency 50. Information about the current flow from the Substation Measurement Controller 51 (and FIG. 6). The status of each Grid from the Grid A Stress Detector 42 and the Grid B Stress Detector 45. Pricing and relative Pricing information from the Price Comparator, and a number of parameters, Flow Policy Parameters 53 and Response Policy Parameters.

In one embodiment of the Flow Decider 48 it first decides the mode it is in, which may be:

Normal Mode. In this mode the decisions about changing electricity flow are derived from Flow Policy Parameters and on price. This is the preferred mode, and will be in operation if conditions dictating other modes are not active.

Response Pass-through Mode. In this mode (which is optional in some embodiments) decisions about changing electricity flows are based on the changes in Frequency of Grid A, so that the Response available on Grid B is passed through to Grid A. In some embodiments this mode may be implemented by using the AC Switch and Phase Detector 20 of FIG. 2. This mode is active if neither Grid is under stress (as determined by the Grid Stress Detectors 42 and 45), and the Response Pass-though Flag is set within the Response Policy Parameters 53. If a Grid becomes Stressed or Enters Crisis, as decided by the Grid Stress Detectors, the Flow Decider will Revert to Normal Mode, and will, if necessary, open the AC Switch and Phase Detector 20.

Black Start Mode. This mode arises from Crisis Mode if the Black Start Priority Flag in the Flow Policy Parameters 53 is set. General behaviour of the ResponsiveSubstation, as described for Black Start, is then carried through by the Flow Decider. One subset of Black Start mode is when a Grid operates at a Black Start Frequency. A 'black start frequency' is a grid frequency that is below the normal frequency of the Grid, and used during recovery. There may be a set of pricing tables/parameters associated with this mode and a similar pricing mechanism can be used as in responsive operation. In one embodiment, this will operate to increase the frequency until it reaches $FH_{max}$ for that NCGF. This will normally be 5% above the Black Start Frequency. When the grid frequency reaches this, the Grid Stress Detectors will shift their detected central frequency, and the Frequency Decider will move to Stress Mode. When a Black Start Frequency is being operated, only a single Flow Decider is active, but the pricing tables are set to encourage movement of the frequency towards its highest frequency, when it will flip to Stress or Normal Mode.

Crisis Mode. This mode arises whenever either (or both) Grids become deenergised or either Grid Frequency drops below the FLMin set for the normal NCGF set for the Grid. In this mode the Flow Decider will first act to minimise or make zero any flow from a surviving Grid. If the Black Start Priority Flag is set it will move to Back Start Mode. Otherwise it will remain in Crisis Mode until the Grid Frequencies depart from their Crisis levels, when it will move into Stress Mode. In crisis mode only a single, default, Flow Decider is active.

Stress Mode. This mode, which need not be implemented in all embodiments, arises if the embodiment of the Grid Stress Detector for either of the Grids connected to the ResponsiveSubstation include Grid Stress alarms. This mode will generally behave in the same way as normal mode, but embodiments may use different Pricing Tables/Parameters. Where there are multiple virtual ResponsiveSubstations this mode may be used to disable all but one of them, and use a single Flow Decider with a specific set of Pricing Tables.

Event Recovery Mode. This mode, which need not be implemented on all embodiments, arises when alarm signals from the Grid Stress Detector, principally the Grid Frequency Rate of Change detector, indicate a significant failure event on the Grid. The alarm may also arise from voltage changes detected, but this is beyond the scope of this specification. When such events arise, the ResponsiveSubstation will change the electricity flow as fast as it can according to pre-programmed event recovery actions. The amount by which the flow changes may be some preset function of the existing flow, or may be a simple step change. The change does not need to be a exact replacement of the electricity flow lost from the failure, but move substantially in the right direction. Once this change has occurred, the ResponsiveSubstation can move to Stress Mode and from there back to normal operation. Entry into Event Recovery Mode will create a special Value event to provide reward for the reliability enhancement rather than for the electricity flowed. Several of these modes use "pricing" information to decide electricity flows, albeit with some variation in the source of pricing and policy parameters, and, in some embodiments, with choice in the Grid Stress Detector used.

The general mode of operation is:

In the absence of any other conditions, the flow is set to the Contracted Flow, a parameter in the Flow Policy Parameters. If no up-to-date Contracted Flow is available, then the equivalent Default Flow will be chosen. Whichever of these is chosen is referred to as the Normal Flow.

If Response Pass-though Mode is set, the Flow Decider will aim to change the flow by an amount proportional to the departure of the Grid A frequency from the NCGF. A parameter, called Droop, within the Response Policy Parameters 54, is used to multiply the frequency variation into a variation to the Normal Flow. This has the effect of making Response in Grid B available to Grid A. 'Droop' is a parameter used to convert the percentage departure of Grid frequency from the NCGF into a percentage change in the electricity flow in this mode.

Any change in flow is subject to limits. Two maximums, AtoBFlowMax and BtoAFlowMax which is a Flow Policy Parameter 53, and defines the maximum flow available in each direction to the Flow Decider. For each direction a maximum rate of increase or reduction: AtoBFlowDI, AtoBFlowDR, BtoAFlowDI and BtoAFlowDR is used to limit the rate of change of flow. These are Flow Policy Parameters 53.

In Normal Mode, the Flow Decider will choose to make electricity flow changes that are "profitable".

That is, if one Grid is "cheaper" as decided by the Price Comparator, the Flow Decider will increase the electricity flow from the "cheaper" Grid to the more "expensive" Grid. This increase will be subject to the limits discussed above, but will also be subject to a value limit ValueMin, so that changes of very low value will be ignored, and a further rate of price driven change limit PriceD, so that the rate of change in response to price signals can be lower than the other rate of change limits. These parameters can be set to dampen any tendency towards oscillation of flows. The Flow Decider will also take into account actual electricity flows, which are provided to it by the Substation Measurement Controller 51 further described in FIG. 6. In general, the electricity Flows decided by the Flow Decider will be carried by the ResponsiveSubstation, but there may be circumstances in which the desired flows are not achieved. In some embodiments the Flow Decider may choose to adjust its decisions by taking such divergence into account.

The Flow Decider will also pass its flow decisions to a Flow Value Calculator 52. This will take into account the increased flow and the prices from the Price Comparator to record a value associated with the change of flow, and calculated as often as is necessary. The Flow Value Calculator 52 may also adjust the value according to the actual flow rather than the flow instructed by the Flow Decider 48. This information is passed to the Substation Measurement Controller 51 and see FIG. 6.

The various operations are moderated by several sets of Parameters. These are: Flow Policy Parameters 53, which are explained above and which modulate decisions about electricity flow; Response Policy Parameters, which modulate decisions about electricity flow when operating in Response Pass-through Mode, as explained above, and Substation Policy Parameters, which modulate decisions made by the Substation Flow Controller explained below.

A default set of these parameters may be "built-in" so ensuring a usable set even in the most extreme of communications failures, but in normal operation Communications Management 56 will provide the messages from the appropriate Management Centre to update the set to be used, and provide the Management Centres with the mechanisms to manage and fine tune the Grid and the ResponsiveSubstation. In general Plow Policy Parameters 53 will be set by the Substation Management Centre of the owner of the "virtual" ResponsiveSubstation. The Response Policy Parameters 54 and the Substation Policy Parameters 55 will be set by the owner of the physical ResponsiveSubstation.

Figure 5:
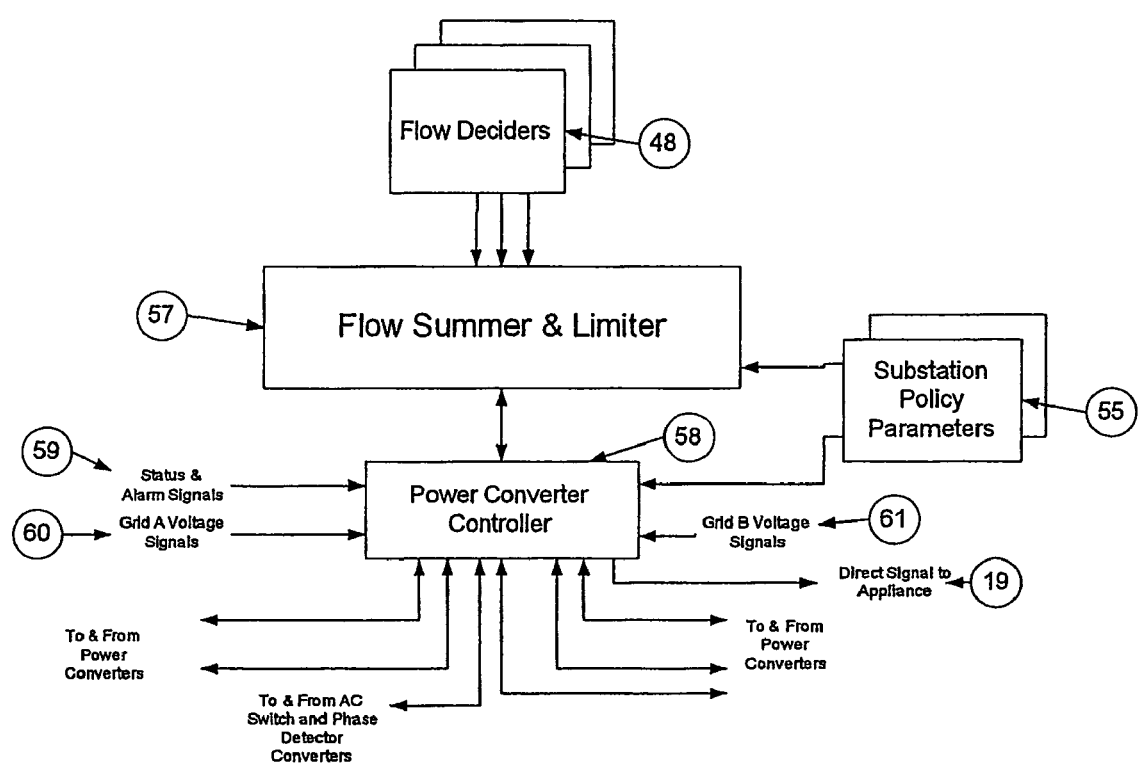
FIG. 5 shows a block diagram of a substation flow controller.

Each physical ResponsiveSubstation will have a single Substation Flow Controller, as shown in FIG. 5.

The Power Converter Controller 58 is responsible for controlling the various power converters that comprise the Responsive Power Controller. It can control the frequency & phase behaviour of these converters. It receives a signal defining for the desired electricity flow from a Flow Summer and Limiter 57. This accepts signals from one or more Flow Deciders 48 within the Responsive Substation, and sums them to define the total electricity flow desired collectively by all Flow Deciders. It is possible that different Flow Deciders will instruct electricity flow in different directions, in which case the Flow Summer and Limiter will balance these flows to produce the net flow.

The Flow Summer & Limiter 57 may also detect the mode of the Flow Deciders, and choose to accept input from only one of them. Any Flow Detector in Black Start Mode will take priority, and all other Plow Deciders will be ignored until the Black Start mode changes. In some embodiments, the Flow Summer and Limiter will choose input only from a Flow Decider operating in Crisis or Failure Event Recovery mode. This is to allow the owner of the ResponsiveSubstation full management the services provided by the ResponsiveSubstation when there is a Grid crisis or emergency.

The Flow Summer & Limiter 57 will check the net total electricity flow against limits set in the Substation Policy Parameters: The maximum electricity flow from Grid A to Grid B AtoBSSFlowMax; the Maximum electricity flow rate from Grid B to Grid A BtoASSFlowMax; the maximum rate of increase of electricity from Grid A to Grid B AtoBSSFlowDI; the maximum rate of reduction of electricity from Grid A to Grid B, AtoBSSFlowDR; maximum rate of increase of electricity from Grid B to Grid A, BtoABSSFlowDI; and maximum rate of reduction of electricity from Grid B to Grid A BtoASSFlowDR. Note that these limits may be less than the sum of limits applied to each Flow Decider of a set of Virtual ResponsiveSubstations. Optionally, the flow limit setting BtoASSFlowMax may be set to zero so that electricity flow can only be from Grid A to Grid B. When set in this way, the embodiment of the Responsive Power Converter may be simpler.

Optionally, there may be a further set of Grid Stress maximum flows, each associated with a maximum time over which such flow is permitted. This may be useful to help the Grid survive for short periods beyond its normal operating limits.

The Power Converter Control 58 may also receive inputs giving the Grid A voltage levels 60 and the Grid B Voltage levels 61. These have two purposes: first, to enable control of phasing and voltage of the injection of flowed electricity into the receiving Grid, so making it possible for the Power Converter Control to adjust its output in response to local reactive power flows. Secondarily as a further signal to establish the health of the Grid.

The Power Converter Control may also receive input from the Substation Measurement Controller This acts as a confirmation of the proper functioning of the controller, and, if necessary, enables feedback control. The Power Converter may also output a Direct Signal to Appliances 19. This will normally be via a DAN or internal communications network, and so would be accessible to any other intelligent devices in the household. (A DAN is a domestic area network. This is the communication system used by devices within a home to exchange information). One use of this signal is to indicate to appliances whether or not the current price of electricity is below the threshold set for the appliance.

As mentioned above, in a preferred embodiment, the flow of electricity through the substation should be measured and records of electricity flow and value flow should be accumulated and maintained for use in other parts of the system. A preferred substation measurement controller for controlling any meters incorporated into the responsive substation to provide such measurements will now be described with reference to FIG. 6.

The purpose of the Substation Measurement Controller is to control any meters incorporated into the Responsive Substation, to provide measurements to other parts of the ResponsiveSubstation, and to accumulate and maintain the records of electricity flow and value flow.

In some embodiments, the Substation Measurement Controller may be under management and ownership different from that of the rest of the ResponsiveSubstation. In some business models this would avoid the possibility of the commercial interests of the ResponsiveSubstation owner tampering with the records so as to give the appearance of delivering electricity flows or services which have not in fact been delivered.

Meter Control 63 incorporates whatever control is necessary to operate and collect data from the chosen Meters. It passes the resulting readings to the Substation Flow Controller 58 of FIG. 5, for use in managing the flows. It also passes the readings to Flow Apportionment 62. Flow Apportionment allocates the net flow to individual virtual Responsive Flow Controllers according to the proportions derived from the electricity flow demands made by the associated Flow Deciders. Each electricity flow is also passed to the corresponding Flow Value Calculators, which return records associated with the electricity flows and with the flow of value. The Electricity Flow Records 64 record the flows attributable to each virtual ResponsiveSubstation as well as the physical Responsive-Substation as a whole. The Value Flow Records 65 record the value, as calculated from the current price and the current electricity flow.

These Records are then made available to Communications Management for passing back to the Grid Management Centres. All records may be passed back to the associated Grid Management Centres of both Grid A and of Grid B, to provide each with the capacity to verify the value claims of the other.

Figure 7:
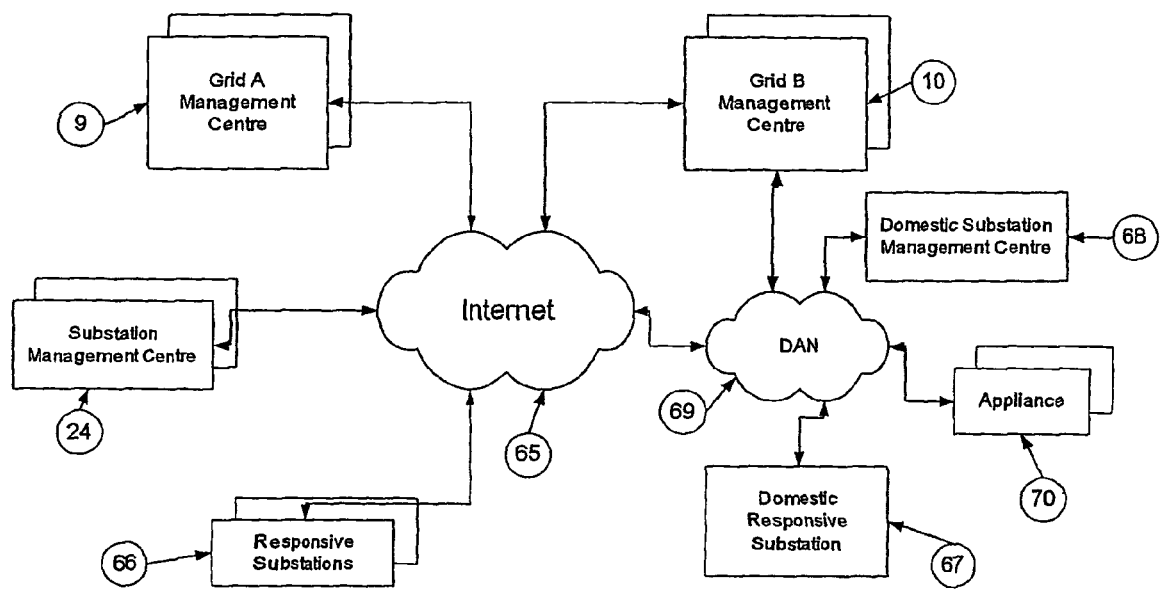
FIG. 7 shows a block diagram of a management centre.

In the preferred embodiment, in which the responsive substation controller controls the flow of electricity in accordance with various parameters, each substation will receive information from a management centre associates with each grid connected to the substation and from a substation management centre. FIG. 7 shows a schematic view of the management centres and their interconnections and will now be described in more detail.

Every ResponsiveSubstation will receive information from three sources:
1. An associated Grid A Management Centre 9
2. An associated Grid B Management Centre 10; and
3. An associated Substation Management Centre 24.

Where the ResponsiveSubstation is designed for use in the home (or a small office) it is a Domestic ResponsiveSubstation 67. The Substation Management Centre may also be based in the home, so being a Domestic Substation Management Centre. It will then normally be integrated with other home management services.

In some business models, and with appropriate co-ordination between then, a single ResponsiveGrid may have multiple Grid Management Centres, with each Grid Management Centre being a Grid Management Centre to some of the ResponsiveSubstation or Virtual ResponsiveSubstations on the Grid. For example, a supplier would have a Grid Management Centre for every Grid to which customers are connected, and would have at least one ResponsiveSubstation or Virtual ResponsiveSubstation on that Grid.

The Grid Management Centres are responsible for all aspects of setting the prices and contract flows that are used within ResponsiveSubstations. Thus it creates sets of Grid Pricing Tables/Parameters 41 and 44 of FIG. 4, and ensures they are available for communication. To do this, they will normally by under the operational Management of companies actively trading electricity, and with customers and or suppliers at all levels in the Grid hierarchy. This operational management will choose the nature and structure of the Grid Pricing Tables/Parameters to suit its own requirements.

These systems will thus often be associated with Trading systems, and the results of prior trading is part of the information from which the Contracted Flows expected of individual ResponsiveSubstations can be derived. The Grid Management Systems will also generally have a detailed model of their expected demands and their configuration, so as to optimise the costs of the electricity they flow from possibly competing Grids.

Grid management Centres will also be responsible for collecting Electricity Flow Records and Value Flow Records from the Substation Measurement Controllers of the ResponsiveSubstations with which they are involved. These will feed transaction accounting and reconciliation systems that to ensure that value flows are ultimately paid for. This may be segregated into separate systems to allow independent controls on records of commercial significance.

Substation management Centres are responsible for making available the various other parameters that enable a ResponsiveSubstation or virtual ResponsiveSubstation to optimise its behaviour. There will be a Substation management Centre associated with every physical ResponsiveSubstation on a Grid, and these may take additional responsibility for managing the behaviour of the Grid under Stress, Crisis or Black Start conditions. Grid Management Centres will need instrumentation associated the Grid they control. This will need to ensure that the frequency behaviour of the Grid is recorded in a way that enables the Value Records to be verified. The Grid Stress Detector will be a component of the instrumentation Generally Grid Management Centres for many Grids will be integrated into a larger centre, with the Grid Management Centre for an individual Grid being only a logical part of the overall system.

The Internet 65 would normally be the mode of communication between ResponsiveSubstation and their associated Management Centres. This communication would need to be fully protected by encryption technology from malicious interference, using conventional technologies.

Domestic ResponsiveSubstations are embodiments of ResponsiveSubstations specifically tuned for use in the home, where it may not be necessary to have an AC Grid, but rather exercise control over Appliances 70 more directly. For example, a Domestic ResponsiveSubstation may control the electricity output of a small CHP system, or a micro turbine, as well as direct the behaviour of consuming devices where there is discretion as to when they run. In a possible embodiment a domestic ResponsiveSubstation can provide ResponsiveLoad control for all the applicable devices in the home. Communication between devices in the home will use many technologies. Here the generic term Domestic Area Network implies all the available technologies, including radio, cable, power line carrier.

Many of the functions of a Grid Management Centre can become vestigial if the Grid being managed is a single home. It may be common for a domestic system to be controlled by the utility or supplier under contract, thus relieving the householder of any detailed understanding of the operation.

As mentioned above, the responsive substations of the present invention can be usefully incorporated in all different parts of a grid system between different levels. It is envisaged that the use of electricity in the future can be made much more efficient by modifying the entire grid to incorporate responsive substations at all or many levels and also to incorporate responsive load devices such as described in GB 2361118 Such a responsive grid is described in more detail below.

The ResponsiveSubstations context and concepts have been explained in earlier sections, but the behaviour of Grids incorporating ResponsiveLoad and ResponsiveSubstations Substations—ResponsiveGrids—are explored here, explaining the benefits that arise.

A Neighbourhood ResponsiveGrid

A neighbourhood ResponsiveGrid is one to which a number, possibly all, houses and offices (subscribers) in an area are connected. There is a cable network connecting all the subscribers and one or more ResponsiveSubstations.

The ResponsiveSubstations connect, on the A side, to a higher voltage Grid, 11 kv (say) and on the other to the three phases of a 230v network. Individual homes may connect either through conventional metering, or through a Domestic ResponsiveSubstation. Subscribers will, over time, use ResponsiveLoad devices in their homes, and will be able to use ResponsiveDevices (such as washing machines). Those with Domestic ResponsiveSubstations (ResponsiveHomes) may also choose to connect devices, such as computers and photovoltaic arrays, through a domestic 42V DC bus.

ResponsiveHomes will normally have their own home control centres, incorporating information and management services to support them in their domestic and entertainment activities. It will be this that acts as the Grid Control centre of the ResponsiveHome.

ResponsiveHomes may also have generating devices, such as a distributed CHP system, PV arrays, or even small wind turbines.

The neighbourhood ResponsiveGrid will also have its own a Grid management centre, likely operated by a utility supplier as one of many it operates. The utility supplier will also normally own the neighbourhood ResponsiveSubstation(s). However, the Grid management centre and the Responsive-Substations could readily be owned co-operatively by subscribers or by other organisations, and suppliers may have competing ResponsiveSubstations on the neighbourhood Grid.

In normal operation:

The neighbourhood Grid management centre(s) will negotiate the purchase of the expected need for electricity for the neighbourhood from the higher voltage Grids to which its ResponsiveSubstation(s) are connected.

The expected electricity flows for each meter period are passed to the ResponsiveSubstations. This may be done well in advance, but may also be fine tuned as the period approaches. They key point is that this is not time critical, and so can, in principle, be done over a slow or very slow communications link.

The neighbourhood ResponsiveSubstations will also receive (from the A and B Grids management centres) the "pricing tables & parameters" defining how the price will change if the imbalance (and thus the frequency) varies. The B pricing tables and parameters are also available to the ResponsiveSubstations in the ResponsiveHomes. Again, "default" prices can be published far in advance, and fine tuned as a period approaches. There is no need for time critical communications to achieve stable control.

In normal operation, the neighbourhood ResponsiveSubstations will flow the electricity as negotiated. If the neighbourhood Grid is not in balance, then Responsive-Load devices will provide stability, and will stabilise the frequency signal available to all devices.

The various devices will use the frequency (and the negotiated prices) to make their own decisions as to how to react. In general, it is likely to be the neighbourhood ResponsiveSubstation(s) that are the most active.

Should there be a failure of a ResponsiveSubstation or the power to it, then the frequency will drop. The missing load may then, in whole or in part, be taken up by other ResponsiveSubstation(s). If this is insufficient, the frequency will continue to be low, and the various devices will move along their pricing curves. Eventually, only the loads worth a high price will stay connected, and all other loads will have been disconnected.

If the failure represents a fraction of the total flow to or from the Grid that is greater than the available Response, then the frequency may start to drop very rapidly. Such failure events can be quickly recognised by other ResponsiveSubstation(s), and they can take rapid, pre-programmed actions, outside the basic price control, that will approximately compensate, for the detected event.

The ResponsiveSubstation that failed will have to compensate its Grid for loss of income, and the ResponsiveSubstation that took extra load will have to compensate the Grid (at the appropriate price). These will not necessarily be equal, and will, in general involved greater cost for electricity (an economically appropriate outcome).

The flows taken by the neighbourhood ResponsiveSubstations will impact the Grid frequency of the next level in the hierarchy. Which we now explore.

The Distribution Network ResponsiveGrid

Neighbourhood ResponsiveGrids, would themselves be fed, at a higher voltage, by Grids that would cover a larger geographical area, and that would feed many Neighbourhood ResponsiveSubstations.

In principle, there could be overlapping and competing higher voltage Grids. The neighbourhood ResponsiveSubstations would flow electricity from their higher voltage Grid only when the demand (indicated by the frequency) and the price (as published by the competing Grids) were appropriate. If the frequencies of competing higher level Grids were both at their central frequency, the flows would then be from the higher level Grid publishing the lowest prices. However, with frequencies of the higher level Grids varying independently, the actual flows would depend also on differences in the pricing tables or variables.

In failure conditions, this provides deep resilience. A neighbourhood Grid can flow electricity from any Grid that is operating, and, as each level in the hierarchy has the same opportunity, flows will occur according to the price each level in the Grid was prepared to pay. If electricity is scarce, frequency declines will cascade down the hierarchy, prices will rise, and more and more devices will switch off.

Failures will, of course, still occur, and could close down one Grid in the hierarchy. Depending upon the desired security of supply, every level of the Grid could have alternative sources. General electricity shortages will dissipate across the whole system, but those who increase their imports will pay higher prices, and those who keep exporting will receive higher prices.

The Transmission Network ResponsiveGrid

Similar behaviours occur at progressively higher levels in the distribution and transmission hierarchy. At each level, competition is possible (although not necessarily desirable), and redundancy and/or distribution of load across multiple units can provide resilience in case of failures. Given the opportunities for arbitrage between Grids, as moderated by the ResponsiveSubstations responding to published prices, there is scope for price differentials between different subsets of a Grid and between different transmission routes.

In these circumstances, the Grid management centre could publish two (or more) sets of prices applicable to different ResponsiveSubstation locations. So prices at one end of a transmission line can be different to those at the other, and the frequency dependent pricing tables can be adjusted to encourage flow behaviours that both optimise the value of the transmission line to its owners and minimise the risks of operation outside design limits.

Such market behaviours do enable market priced rewards to Grids that transfer electricity flows over a network, with imports at one place and exports at another. The price differentials which can vary over a day or period give profit opportunities to Grids that transfer power most efficiently, and give market signals that encourage generation at places where demand is greatest.

There is also scope for different parts of the transmission Grid to be operated at different frequencies, and this is likely to be most useful on some long distance circuits where lower frequencies can bring improved transmission characteristics. At the extreme, of course, this corresponds to DC transmission.

ResponsiveGrids are much less prone to blackouts than current Grids, and will normally degrade gracefully, giving time for corrective action before blackout, and surviving, that is remaining energised, even when the vast majority of demand and or generation has disconnected. The extent of failures will also normally be much less.

However, there are circumstances where individual ResponsiveGrids, and even multiple ResponsiveGrids will fail completely. This could leave ResponsiveSubstations connected to two Grids both of which are unenergised or Black. How do ResponsiveSubstations behave when one or other Grid is reenergised?

Clearly, the first step is to use any source of electricity to operate the Responsive Flow Controller and associated Grid Stress Detectors. Normally, these will be low consuming devices and can be protected by their own power supplies.

Once the ResponsiveSubstation control systems are functioning the sequence will normally be as follows:

1. Set the Responsive Power Converters to the safest possible configuration. This will normally be with all electricity flow prevented.
2. When a Grid Central Frequency and Parameter Detector in a Grid Stress Detector sees a frequency on their associated Grid, they will decide the Nominal Grid Central Frequency to use and will reset any Central Frequency Crossing Detectors and thus all Clock Comparators. Signals about the Grid will flow into the Responsive Flow Controllers(s).
3. There may be multiple Responsive Flow Controllers in a ResponsiveSubstation, but only a single one may be active during Grid Crisis or on Black Start, so all except the primary Grid Crisis Responsive Flow Controller is disabled until the Grid Crisis is again under control.
4. The Responsive Flow Controller, when it recognises one active and one inactive Grid, will use its Black Start Appointment Status to decide whether it will take any action. If it is appointed to Black Start duties, it will also decide the frequency at which it will energise the inactive Grid. For small Grids, this will usually be the normal NCGF, of say 50 Hz or 60 Hz. It will normally choose to flow using a value a bit below the NCGF, so giving itself and other ResponsiveSubstations on the Grid an opportunity to apply their pricing mechanism to increase the flow, and giving consuming devices the opportunity to stay switched off until the Grid frequency approaches normal again.
5. For some Grids, the ResponsiveSubstation may be set to adopt a lower emergency Grid Frequency, set to be (say) 10% below that used for Normal Operation. This energises the Grid, and enables Grid survival devices to consume electricity, but also signals to all ResponsiveSubstations that Black Start mode is to be used. This prevents all but Grid Crisis Flow Deciders influencing the electricity flow.
6. The Grid Crisis Flow Deciders use the normal pricing mechanism, using special pricing tables and parameters reserved for this purpose. In general, these will be set to increase the electricity flow into the Grid until the frequency reaches the upper frequency limit (at 5% above the Grid Crisis nominal frequency). At that frequency, which is also 5% below the NCGF normally used, Grid Stress Detectors will recognise the new NCGF and so will activate the normal flow control mode, with its mechanisms for pricing increased flow until the situation is returned to normal.
7. In such crisis conditions the measured metered flow represents a small proportion of the value delivered, and it would be reasonable to suspend normal metering for a short period, rewarding instead according to the survival of the Grid.

Interconnecting Interconnections

Interconnections, such as the North American Eastern Interconnect which suffered the catastrophic failure in August 2003, can themselves be interconnected with other interconnects, and the same principles of ResponsiveSubstations can be applied.

The vision presented in this section, of a hierarchically organised set of individually autonomous Grids, each resilient and each potentially capable of self contained operation, will not come about overnight. Indeed, the eventual implementation will take many years of progressive enhancement to existing substations and progressive implementation of individual Grids and ResponsiveSubstations.

Planning of this transition presents some interesting problems. At which level in the hierarchy are current ResponsiveSubstation technologies most cost effective? In the home, where domestic ResponsiveSubstations could be combined with a meter replacement programme and some form of communications channel to the meter? At the neighbourhood level, where ResponsiveSubstations may provide enhanced security and reliably at the local level? At the Distribution level, where distribution networks are becoming difficult to manage, and where the automatic stabilisation of a district Grid can reduce management and control problems? Or at the Transmission level, where technologies that have served us well for 50 years are becoming obsolete?

In general, investment may best be focused to form individual "islands". Initially, these may be operated only to enhance reliability when the Grid is under stress, but, as knowledge of Grid management pricing becomes greater, these islands can achieve their own "frequency freedom", and, once a few exist, these islands can be made into their own Grids, and remaining parts of the Grid network partitioned.

Progressive implementation, simultaneously at many levels in the hierarchy, is possible, and provides reliability and financial rewards whenever they are installed.

The invention claimed is:

1. A substation of an electricity grid system, the substation connecting two grid parts operating at different frequencies and/or voltage levels, the substation comprising means for monitoring a parameter indicative of the electricity available from and/or the electricity required by the two grid parts and responsive flow control means for controlling the flow of electricity between the two grid parts in response to the parameter of the two grid parts, characterized in that said means for monitoring is configured to derive the parameter of one or both of the grid parts from an integration of a frequency of said one or both of the grid parts since a reset point.

2. The substation of claim 1, wherein the frequency is monitored as an absolute frequency value.

3. The substation of claim 1, wherein the frequency is monitored as a measure of frequency deviation from a normal operating frequency, said normal operating frequency being the frequency when the respective grid part is not under stress.

4. The substation of claim 1, further comprising means for modulating the flow of electricity between the two grid parts to bring the AC phases of the two grid parts closer to matching one another.

5. The substation of claim 4, wherein the means for bringing the AC phases closer to matching one another comprises a switch.

6. The substation of claim 1, wherein said parameter of one or both of the grid parts comprises a signal indicative of an imbalance between the electricity available and electricity required by said one or both of the grid parts.

7. The substation of claim 1, wherein said parameter is a value parameter indicative of the value of electricity to said one or both of the grid parts.

8. A substation as claimed in claim 7, wherein the value parameter comprises a monetary price value.

9. A substation as claimed in claim 8, wherein said monetary price is variable in dependence on the frequency of the one of the grid parts or both of the grid parts.

10. The substation of claim 1, further comprising a clock driven by the frequency of said one or both grid parts, a clock driven by a grid nominal frequency and a clock comparator for comparing the clocks.

11. The substation of claim 1, further comprising at least one electricity flow meter for metering electricity flow between the two grid parts.

12. The substation of claim 1, further comprising means for detecting a rate of change of the frequency of one or both grid parts, said means for controlling configured to control the flow of electricity in response to the rate of change detected.

13. An electricity supply grid system comprising two grid parts connected by the substation of claim 1, wherein each grid part comprises one or more loads and a management unit for providing said parameter.

14. The electricity supply grid system of claim 13, said management unit for regulating the consumption of electricity by said one or more loads in dependence on the frequency of the respective grid part.

15. The substation of claim 14, wherein said parameter is a value parameter indicative of the value of electricity to said one or both of the grid parts and one of the grid parts is an electricity generator, said generator configured to increase or decrease its electricity output in dependence on said value parameter.

16. The substation of claim 14, wherein said parameter is a value parameter indicative of the value of electricity to said one or both of the grid parts and one of the grid parts is an electricity consuming device, said consuming device configured to increase or decrease its consumption in dependence on said value parameter.

17. The substation of claim 2, further comprising means for modulating the flow of electricity between the two grid parts to bring the AC phases of the two grid parts closer to matching one another.

18. The substation of claim 3, further comprising means for modulating the flow of electricity between the two grid parts to bring the AC phases of the two grid parts closer to matching one another.

19. The substation of claim 17, wherein said parameter is a value parameter indicative of the value of electricity to said one or both of the grid parts and one of the grid parts is an electricity generator, said generator configured to increase or decrease its electricity output in dependence on said value parameter.

20. The substation of claim 17, wherein said parameter is a value parameter indicative of the value of electricity to said one or both of the grid parts and one of the grid parts is an electricity consuming device, said consuming device configured to increase or decrease its consumption in dependence on said value parameter.

* * * * *